United States Patent [19]
Calkins

[11] 3,874,707
[45] Apr. 1, 1975

[54] SELF-ADJUSTING SEAL LOAD COMPENSATOR

[75] Inventor: Donald L. Calkins, Three Rivers, Mich.

[73] Assignee: The Johnson Corporation, St. Joseph, Mich.

[22] Filed: Feb. 5, 1973

[21] Appl. No.: 329,707

[52] U.S. Cl.............. 285/93, 285/95, 285/135
[51] Int. Cl............ F16l 17/00, F16l 33/16
[58] Field of Search....... 285/93, 95, 134, 135, 101, 285/102; 92/85

[56] References Cited
UNITED STATES PATENTS

| | | | |
|---|---|---|---|
| 2,700,558 | 1/1955 | Hieronymus | 285/167 |
| 2,705,650 | 4/1955 | Saum | 285/135 |
| 2,984,529 | 5/1961 | Dailey | 92/85 |
| 3,098,665 | 7/1963 | Smith | 285/134 |
| 3,449,839 | 6/1969 | Crist | 285/134 |
| 3,594,021 | 7/1971 | Williams | 285/93 |

Primary Examiner—Werner H. Schroeder
Attorney, Agent, or Firm—Beaman & Beaman

[57] ABSTRACT

A self-adjusting seal load compensator for use with rotary fluid joints comprising an expansible motor type device utilizing a freely axially movable piston having a piston rod bearing against a rotary fluid joint to compensate for fluid pressures exerted upon the rotary joint seal structure. Indicating means are located upon the piston rod to indicate the degree of extension of the piston rod from its associated cylindrical chamber, and thereby indicate the condition of rotary joint seal wear. Compensating movement of the rotary joint by the invention is limited to prevent metal-to-metal wear, and the compensator includes built-in stop means.

6 Claims, 4 Drawing Figures

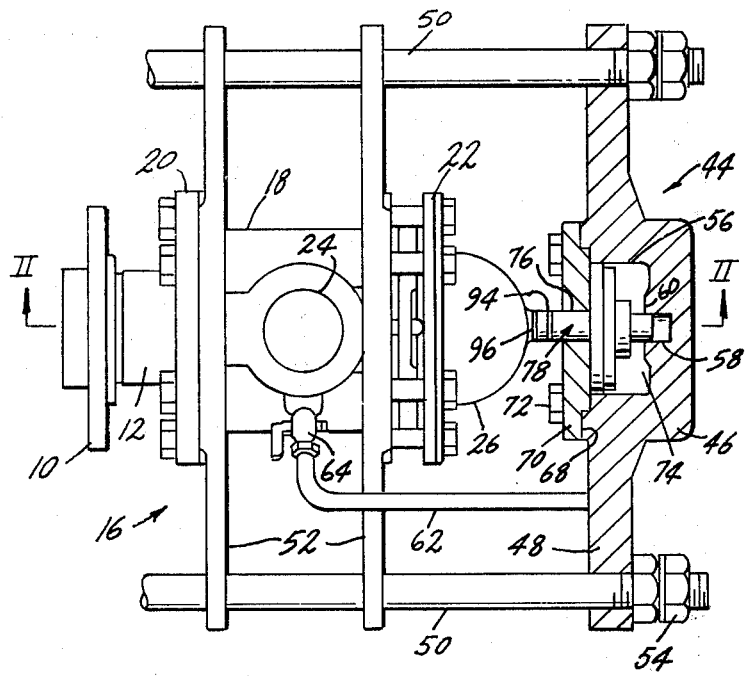
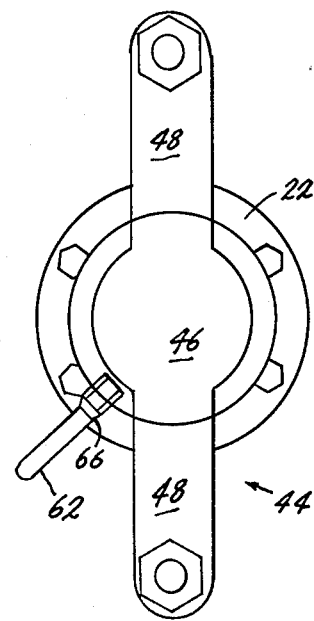
FIG.1  FIG.4
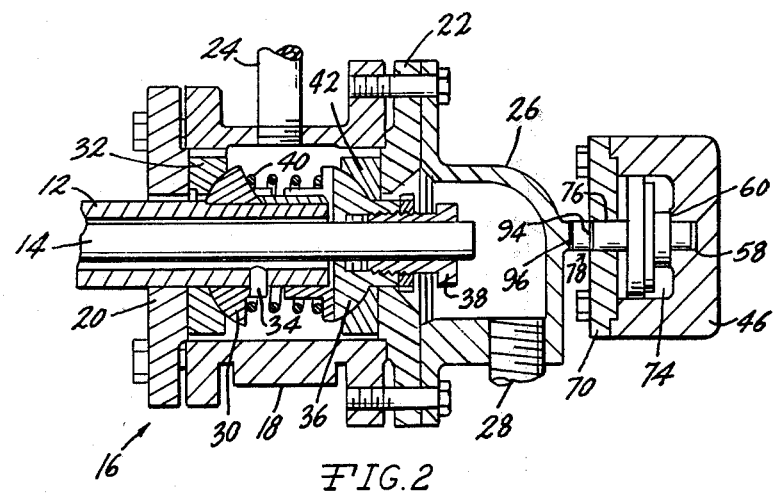
FIG.2
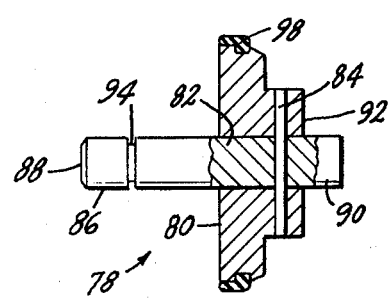
FIG.3

3,874,707

SELF-ADJUSTING SEAL LOAD COMPENSATOR

BACKGROUND OF THE INVENTION

The invention pertains to compensating devices for rotary fluid joints for the purpose of counterbalancing seal pressures existing in self-aligning and self-adjusting rotary joint seals.

Rotary fluid joints are widely used in the papermaking, fabric and other web manufacturing arts wherein heating and cooling drums are rotated while being engaged by the web being treated. Steam introduced into the drum, or cooling water introduced therein, produces the desired temperature of the drum for treatment of the web. Such joints include housings into which the heating or cooling is introduced under pressure, and also usually include a chamber communicating with exhaust or syphon structure communicating with the interior of the drum for removing the medium from the drum after heat exchange has taken place.

Many rotary joint applications are for the purpose of injecting steam into a rotating drum, and the steam condensate is removed therefrom. It will be appreciated that due to the high temperature, and the presence of corrosive elements within the medium, the sealing structure of rotary joints is exposed to adverse operating conditions, and it is to be expected that considerable rotary joint seal wear occurs during operation.

As the rotary joints are usually associated with the drum syphon structure, and are mounted upon conduits coaxial with the drum, the presence of misalignment between the drum and the joint often causes movement between the stationary and rotating parts of the joint and it is common to utilize self-adjusting and compensating features with the sealing structure of rotary joints. In this regard reference is made to U.S. Pat. Nos. 1,929,635; 2,222,612; 2,328,898; 2,352,317; 2,385,421; 2,477,762; 2,497,183 and Reissue U.S. Pat. No. 23,298.

The assignee of the instant invention has long manufactured a rotary fluid joint having self-adjusting and compensating seal structure which permits the seals to accommodate themselves to misalignment existing between the rotating drum and the rotary joint support, and also to compensate for seal wear. In particular, reference is made to U.S. Pat. No. 2,700,558. This type of rotary joint employs collars having spherical surfaces defined thereon which rotate with the drum, and these collars sealingly engage with annular seal rings also sealingly engaged with the rotary joint housing. At least one of the collars is axially movable with respect to the other in order to compensate for seal wear, and a spring is utilized to produce a biasing force used in such compensation.

The presence of the pressurized medium, such as steam, within the rotary joint housing in which the bearing structure is mounted produces relatively high pressures between the collar, sealing rings and housing due to the "piston" effect of the axially movable mounting of at least one of the collars, and in order to prevent excessive seal pressures a load compensator is commonly used as disclosed in U.S. Pat. No. 2,700,558.

In the load compensator described in the above mentioned patent a plunger is movably mounted within a housing assembly for movement by a diaphragm influenced by the pressure existing within the rotary joint housing. Thus, the plunger exerts a counterforce on the rotary joint counteracting the piston effect produced by the pressurized medium within the joint which is proportional to the pressure within the joint, and the sealing ring life is extended.

A disadvantage of the load compensator as disclosed in U.S. Pat. No. 2,700,558 lies in the fact that the diaphragm exerts variable forces on the compensating plunger during movement of the plunger during its operation. For instance, the amount of force necessary to extend the plunger a maximum extent toward the rotary joint is considerably greater than the amount of force necessary to produce a similar compensating plunger force when the diaphragm is relatively undistorted. The nature of construction of the diaphragm requires that the diaphragm be significantly distorted during maximum deflection, and thus the force necessary to operate the plunger will vary in view of the position of the plunger as determined by the condition of the diaphragm. Additionally, inaccuracies and pressure variations are produced as the diaphragm ages, and the effective "stroke" of the plunger is relatively limited in order to prevent over-stressing or excessive distortion of the diaphragm requiring several adjustments and relocations of the load compensator during the effective life of a single set of rotary joint seals.

The adjustment of load compensators constructed in accord with U.S. Pat. No. 2,700,558 is often most troublesome and difficult as the rotary joints and compensators are often mounted under protective hoods wherein the temperature ranges are too high for comfortable working conditions, and the maintenance and readjustments required of the patented load compensator has created difficulties and requires excessive maintenance.

SUMMARY OF THE INVENTION

It is an object of the invention to provide a load compensator for rotary fluid joints wherein the compensator need only be adjusted once during the life of each set of rotary joint seals.

An additional object of the invention is to provide a load compensator for rotary joint seals wherein the compensating force exerted by the device is uniform throughout its cycle of operation, and as a free floating piston, rather than a diaphragm, is utilized, the force exerted by the compensator near its limits of operation is equal to that produced at the intermediate stages of operation, and no excessive distortion or compensating forces are required in order to produce uniform seal compensating pressures.

An additional object of the invention is to provide a load compensator for rotary fluid joints wherein the compensator may be readily inspected, and indicates the condition of wear of seals within the rotary joint with which it is associated. Additionally, the load compensator employed with the invention "bottoms out" prior to the failure and depletion of the rotary seals in order to indicate that seal replacement is necessary, and yet maximum life is obtained from the seals.

In the practice of the invention the load compensator employs a housing in which a cylindrical chamber is defined. A piston is slidably received within the chamber having a piston rod adapted to engage a rotary fluid joint. The piston is exposed to the pressurized medium within the joint housing and the construction permits uniform compensating forces to be imposed upon the rotary joint seals at all times during operation. Annular indicating means are defined upon the portion of the pipston rod extending from the housing such that the operator may readily view when the indicating groove is received within the compensator housing indicating the need for rotary joint seal replacement.

BRIEF DESCRIPTION OF THE DRAWINGS

The aforementioned advantages and objects of the invention will be appreciated from the following description and accompanying drawings wherein:

FIG. 1 is a top view of a rotary fluid joint and compensator in accord with the invention, the compensator being shown in section with the piston extended, FIG. 2 is a sectional view of the components of FIG. 1 along II—II illustrating the compensator piston in the retracted position, FIG. 3 is a detail view of the compensator piston structure, partially sectional, and FIG. 4 is an end view of the load compensator as taken from the right of FIG. 1.

DESCRIPTION OF THE PREFERRED EMBODIMENT

In the drawings a rotary heat exchange drum journal adapter is represented at 10, and this adapter is mounted upon the end of a rotary drum journal. The rotary joint adapter 10 mounted upon the drum journal, not shown, supports a tubular sleeve or nipple 12, which will rotate with the drum. A syphon conduit 14 is mounted within the nipple 12, aand the syphon conduit communicates with syphon structure within the rotary drum, not shown.

The rotary fluid joint 16 includes a housing 18 which is of an annular configuration circumscribing the end of the nipple 12. The housing includes an inner wall plate 20 attached to the housing by bolts, and an outer wall plate 22 is attached to the other end of the housing by bolts. Each of the plates 20 and 22 include inner flat annular surfaces concentrically disposed about the axis of the nipple. Pressurized medium, such as steam, is introduced into the housing 18 through a port and conduit 24, and a syphon housing 26 is bolted to the outer side of the outer plate 22 communicating with the open end of the syphon conduit 14 by the bolts mounting wall plate 22 on the housing for receiving the exhausted or syphoned condensate from the drum. Port and conduit 28 remove the condensate from the housing 26.

A collar 30 is mounted upon the nipple 12 and includes a spherical surface which cooperates with a correspondingly shaped surface defined upon the annular sealing ring 32. The sealing ring 32 also includes an annular flat surface for sealingly engaging the inner surface of wall 20. The nipple and collar include ports 34 connecting the chamber of the housing 18 with the interior of the nipple 12 whereby the pressurized medium within the housing may be introduced into the dryer drum.

The collar 36 is mounted upon the syphon conduit 28 and is sealed thereto by the packing gland 38. The collar 36 is movable in a direction away from the collar 30, and is biased by the compression spring 40, which maintains the collar spherical surface against the spherical surface of the seal ring 42, also producing engagement of the flat surface of the sealing ring with the flat inner surface of the outer wall plate 22.

From the above it will be appreciated that the introduction of pressurized medium into the housing 18 tends to provide an unbalanced force to the right, FIGS. 1 and 2, due to the difference in piston area within the housing as produced by collars 30 and 36, and associated seal and housing structure.

In order to compensate for this unbalanced force, a compensating device is utilized for imposing a force on the housing tending to shift the same to the left, FIGS. 1 and 2. The principles involved are similar to those described in U.S. Pat. No. 2,700,558.

The compensator 44 consists of a housing 48 having a pair of radially extending arms 48 having holes defined therein for receiving the support rods 50. The support rods 50 slidably extend through housing projections 52 defined upon the housing 18, and are anchored into the stationary bearing case, not shown. The outer ends of the rods are threaded to receive lock nut sets 54.

The housing 46 includes a recess 56 having a cylindrical periphery, an axial blind bore 58 of cylindrical configuration, and an annular stop surface 60 concentric with the axis of the recess.

The pressurized medium within the housing 18 communicates with the recess 56 through a conduit 62 communicating with the housing 18 at valved fitting 64 and the other end of the conduit communicates with the recess 56 through the inlet fitting 66.

The recess 56 is shouldered at 68, and cover plate 70 is attached to the housing 46 superimposed over the recess and removably attached thereto by bolts 72, wherein the recess and plate defines a cylindrical chamber 74. The cover plate 70 is provided with a bore 76 coaxially aligned with the axis of the chamber 74, and the blind bore 58.

A piston 78 is slidably received within the chamber 74, FIG. 1, and the piston consists of a disk-like member 80 through which the piston rod 82 extends and is axially fixed thereto by the pin 84. The piston rod 82 includes an outer end region 86, having an end 88, which extends through the cover plate bore 76, and the piston rod portion 90 constitutes a projection which is slidably received within the blind bore 58. The disk 80 includes an annular stop surface 92 which is planar in configuration and abuts against the chamber stop surface 60 to limit movement of the piston to the right, FIG. 2.

The outer end region 86 of the piston rod is provided with an annular indicia groove 94, and the syphon chamber housing 26 is provided with a boss 96 adapted to be engaged by piston end 88 as will be apparent from FIGS. 1 and 2.

The periphery of the piston disk 80 is provided with a sealing ring 98 wherein a slidable, yet sealed relationship, exists between the piston and the wall of chamber 74.

In operation, the compensator 44 is initially mounted to the rotary joint 16 only after a new joint has been installed, or new seal rings 32 and 42 have been installed. After the rotary joint 16 is in place, the compensator housing 46 is mounted upon the support rods 50 and moved toward the rotary joint until the piston end 88 engages the housing boss 96 with the piston rod 82 fully extended to the left, as shown in FIG. 1.

While maintaining this position of the housing 46 with the piston rod fully extended, the support rod nuts 54 are tightened to accurately position the compensator housing.

Thereupon, the pressurized medium is introduced into the housing 18 through the conduit and port 24, and this pressurized medium will also be introduced into the chamber 74 through the conduit 62 and the inlet fitting 66. The pressure within the chamber 74 thus keeps the piston rod 82 extended to the left its maximum extent, as determined by the engagement of the piston disk 80 with inner surface of the cover plate 70.

The force imposed upon the rotary joint housing by the compensator piston rod 82 compensates for the unbalanced forces existing within the rotary joint 16 reducing the pressures on the sealing rings 32 and 42 in the manner as described in U.S. Pat. No. 2,700,558. As the sealing rings 32 and 42 wear, such sealing rings are usually formed of graphite or similar material, the rotary joint 16 will slowly move toward the compensator 44 against the biasing force created by the compensator. Such movement of the rotary joint housing 18 to the right causes the piston rod 82 to move to the right relative to the cover plate 70 reducing the distance between the groove 94 and the outer surface of the cover plate.

When a predetermined amount of seal ring wear has occurred, the indicator groove 94 will be completely within the cover plate 70 and by visual inspection the operator can determine this condition which indicates that the allowable seal wear has taken place and that the seal rings 32 and 42 should be replaced. The indicator groove 94 is so located that it will be received within the cover plate bore 76 when 80% of the allowable seal ring wear has occurred, and thus maximum wear is obtained from the seal rings, but the seals are replaced before metal-to-metal wear takes place between the collars and the housing end wall plates 20 and 22, which would necessitate replacement of metal parts, rather than the seal rings alone.

Movement of the piston 82 to the right is limited by engagement of the stop surface 60 with the abutment surface 92. Thus, by visual inspection the operator can determine when the time for replacement of the seal rings approaches, and the compensator indicates when seal rings should be replaced which will prevent damage to the rotary joint due to excessive seal ring wear.

As the piston 82 is freely slidable within the chamber 74, the forces exerted upon the rotary joint 16 by the piston throughout the entire range of movement of the piston are at all times equal, which is not possible with a diaphragm type of compensator as disclosed in the previously mentioned patent. Constant load conditions can be accurately calculated and maintained in the practice of the invention, which was not possible with the prior construction, and by determining the effective pressure areas within the housing and the compensator, optimum compensating forces may be produced during all conditions of seal wear. The invention eliminates the necessity for compensator adjustment by nuts 54 prior to the need for replacing the rotary joint seal rings, and thus maintenance and labor costs are substantially reduced as compared with prior devices.

It is appreciated that various modifications to the inventive concept may be apparent to those skilled in the art without departing from the scope of the invention.

I claim:

1. A self-defined self-adjusting seal load compensator for pressurized rotary fluid joints comprising, in combination, a supporting housing, means supporting said housing for mounting adjacent a rotary fluid joint, a chamber defined within said housing having a cylindrical wall and an axis, a piston freely slidably mounted within said chamber having a periphery, an outer side remote from the fluid joint, and an inner side disposed toward the fluid joint, said piston periphery sealingly engaging said chamber, a piston rod mounted on said piston and slidably extending through said housing for engagement with a rotary fluid joint, said piston rod including an outer end and an adjacent outer end region extending from said housing for engaging the associated rotary fluid joint and being exteriorly visible, indicating means mounted on said piston outer end region indicating the axial position of said piston within said chamber, and a pressurized medium inlet port communicating with said chamber and said piston outer side and communicating with the fluid pressure supplied to the associated rotary joint.

2. In a self-adjusting seal load compensator as in claim 1 wherein said indicating means comprises indicia mounted on said piston outer end region.

3. In a self-adjusting seal load compensator as in claim 2 wherein said inidica comprises an annular configuration defined on said piston outer end region.

4. A self-defined self-adjusting seal load compensator for pressurized rotary fluid joints comprising, in combination, a supporting housing, means supporting said housing for mounting adjacent a rotary fluid joint, a chamber defined within said housing having a cylindrical wall and an axis, said chamber comprising a recess defined in said housing, a removable cover plate superimposed over said recess, fastening means releasably mounting said cover plate on said housing, a piston freely slidably mounted within said chamber having a periphery, an outer side remote from the fluid joint, and an inner side disposed toward the fluid joint, said piston periphery sealingly engaging said chamber, a piston rod mounted on said piston and slidably extending through said housing for engagement with a rotary fluid joint, said cover plate including a bore coaxial with the axis of said chamber slidably receiving said piston, a blind bore defined in said chamber coaxial therewith, a guide projection defined on said piston coaxial with said piston and chamber extending away from said piston outer side slidably received within and guided by said blind bore, the axial dimension of said projection being great enough to engage said blind bore at all positions of said piston within said chamber, said bore and blind bore maintaining the proper orientation of said piston within said chamber at all axial positions of said piston, and a pressurized medium inlet port communicating with said chamber and said piston outer side and communicating with the fluid pressure supplied to the associated rotary joint.

5. A self-defined self-adjusting seal load compensator for pressurized rotary fluid joints comprising, in combination, a supporting housing, means supporting said housing for mounting adjacent a rotary fluid joint, a chamber defined within said housing having a cylindrical wall and an axis, a piston freely slidably mounted within said chamber having a periphery, an outer side remote from the fluid joint, and an inner side disposed toward the fluid joint, said piston periphery sealingly engaging said chamber, a piston rod mounted on said piston and slidably extending through said housing for engagement with a rotary fluid joint, stop means defined in said housing within said chamber, abutment means defined on said piston outer side engageable with said stop means limiting movement of said piston and piston rod in a direction away from the rotary fluid joint, and a pressurized medium inlet port communicating with said chamber and said piston outer side and communicating with the fluid pressure supplied to the associated rotary joint.

6. In a self-adjusting seal load compensator as in claim 5 wherein said stop means comprises an annular surface defined in said chamber concentric to the axis thereof, and said abutment means comprises an annular surface defined on said outer side of said piston concentric to the piston axis and in opposed relation to said stop means surface.

* * * * *